(12) United States Patent
Halm

(10) Patent No.: US 12,181,124 B2
(45) Date of Patent: Dec. 31, 2024

(54) TAIL LIGHT FOR A MOTOR VEHICLE

(71) Applicant: Bayerische Motoren Werke Aktiengesellschaft, Munich (DE)

(72) Inventor: Markus Halm, Baldham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/558,554

(22) PCT Filed: Jun. 13, 2022

(86) PCT No.: PCT/EP2022/066035
§ 371 (c)(1),
(2) Date: Nov. 2, 2023

(87) PCT Pub. No.: WO2023/280524
PCT Pub. Date: Jan. 12, 2023

(65) Prior Publication Data
US 2024/0218999 A1    Jul. 4, 2024

(30) Foreign Application Priority Data

Jul. 8, 2021   (DE) ...................... 10 2021 117 618.2

(51) Int. Cl.
*F21S 43/237*  (2018.01)
*B60Q 1/30*    (2006.01)
(Continued)

(52) U.S. Cl.
CPC .............. *F21S 43/237* (2018.01); *B60Q 1/30* (2013.01); *F21S 43/13* (2018.01); *F21S 43/245* (2018.01); *F21S 43/247* (2018.01); *B60Q 11/002* (2013.01)

(58) Field of Classification Search
CPC ......... H01S 5/02251; B60Q 3/54; B60Q 3/56; B60Q 3/62; B60Q 3/64; B60Q 1/263;
(Continued)

(56) References Cited

U.S. PATENT DOCUMENTS 10,400,973 B1    9/2019  Espinosa et al.
2011/0103757 A1  5/2011  Alkemper et al.
(Continued)

FOREIGN PATENT DOCUMENTS

CN   112238809 A  *  1/2021
DE   298 07 774 U1   7/1998
(Continued)

OTHER PUBLICATIONS

Machine translation of CN 112238809A, retrieved from worldwide.espacenet.com on Sep. 5, 2024 (Year: 2024).*
(Continued)

*Primary Examiner* — Abdulmajeed Aziz
*Assistant Examiner* — Steven Y Horikoshi
(74) *Attorney, Agent, or Firm* — Crowell & Moring LLP

(57) ABSTRACT

A tail light includes a housing with a translucent cover panel and one or more flexible light guides at least partly arranged in the housing. Each light guide contains one or more fibers which extend between two ends of the respective light guide in the longitudinal direction thereof. One or more laser light sources are provided at one end of each light guide, and the supplied light produces an emission of light out of the respective light guide along the longitudinal direction thereof. At least one part of the emitted light exits the tail light via the cover panel as a first light emission. An additional lighting device with one or more LEDs is at least partly arranged in the housing and is configured such that light originating from the LED(s) exits the tail light via the cover panel as a second light emission.

18 Claims, 4 Drawing Sheets

(51) Int. Cl.
 *F21S 43/13* (2018.01)
 *F21S 43/245* (2018.01)
 *F21S 43/247* (2018.01)
 *B60Q 11/00* (2006.01)

(58) Field of Classification Search
 CPC ........ F21S 43/247; F21S 41/24; F21S 43/235; F21S 43/236; F21S 43/237; F21S 43/251; F21S 43/27; F21V 2200/10; F21V 2200/15
 See application file for complete search history.

(56) References Cited

U.S. PATENT DOCUMENTS

| | | | |
|---|---|---|---|
| 2019/0105514 A1 | 4/2019 | Amstutz et al. | |
| 2019/0317262 A1* | 10/2019 | Benter | F21S 43/26 |
| 2021/0188158 A1* | 6/2021 | Monti | B60Q 1/1423 |

FOREIGN PATENT DOCUMENTS

| | | | | |
|---|---|---|---|---|
| DE | 102013103410 A1 * | 10/2014 | | B60Q 1/0041 |
| DE | 102016003812 A1 * | 9/2017 | | |
| DE | 10 2016 210 363 A1 | 12/2017 | | |
| DE | 10 2017 100 754 A1 | 7/2018 | | |
| DE | 10 2017 205 628 A1 | 10/2018 | | |
| DE | 10 2019 118 518 A1 | 1/2021 | | |
| DE | 10 2015 103 850 B4 | 2/2021 | | |
| DE | 102021131258 A1 * | 6/2023 | | B60Q 1/263 |
| WO | WO 2009/100834 A1 | 8/2009 | | |

OTHER PUBLICATIONS

Machine translation of DE 102013103410A1, retrieved from worldwide.espacenet.com on Sep. 5, 2024 (Year: 2024).*
Machine translation of DE 102016003812A1, retrieved from worldwide.espacenet.com on Sep. 5, 2024 (Year: 2024).*
Machine translation of DE 102021131258A1, retrieved from worldwide.espacenet.com on Sep. 5, 2024 (Year: 2024).*
International Search Report (PCT/ISA/210) issued in PCT Application No. PCT/EP2022/066035 dated Sep. 22, 2022 with English translation (6 pages).
German-language Written Opinion (PCT/ISA/237) issued in PCT Application No. PCT/EP2022/066035 dated Sep. 22, 2022 with English translation (11 pages).
German Search Report issued in German Application No. 10 2021 117 618.2 dated May 4, 2022 with partial English translation (11 pages).

* cited by examiner

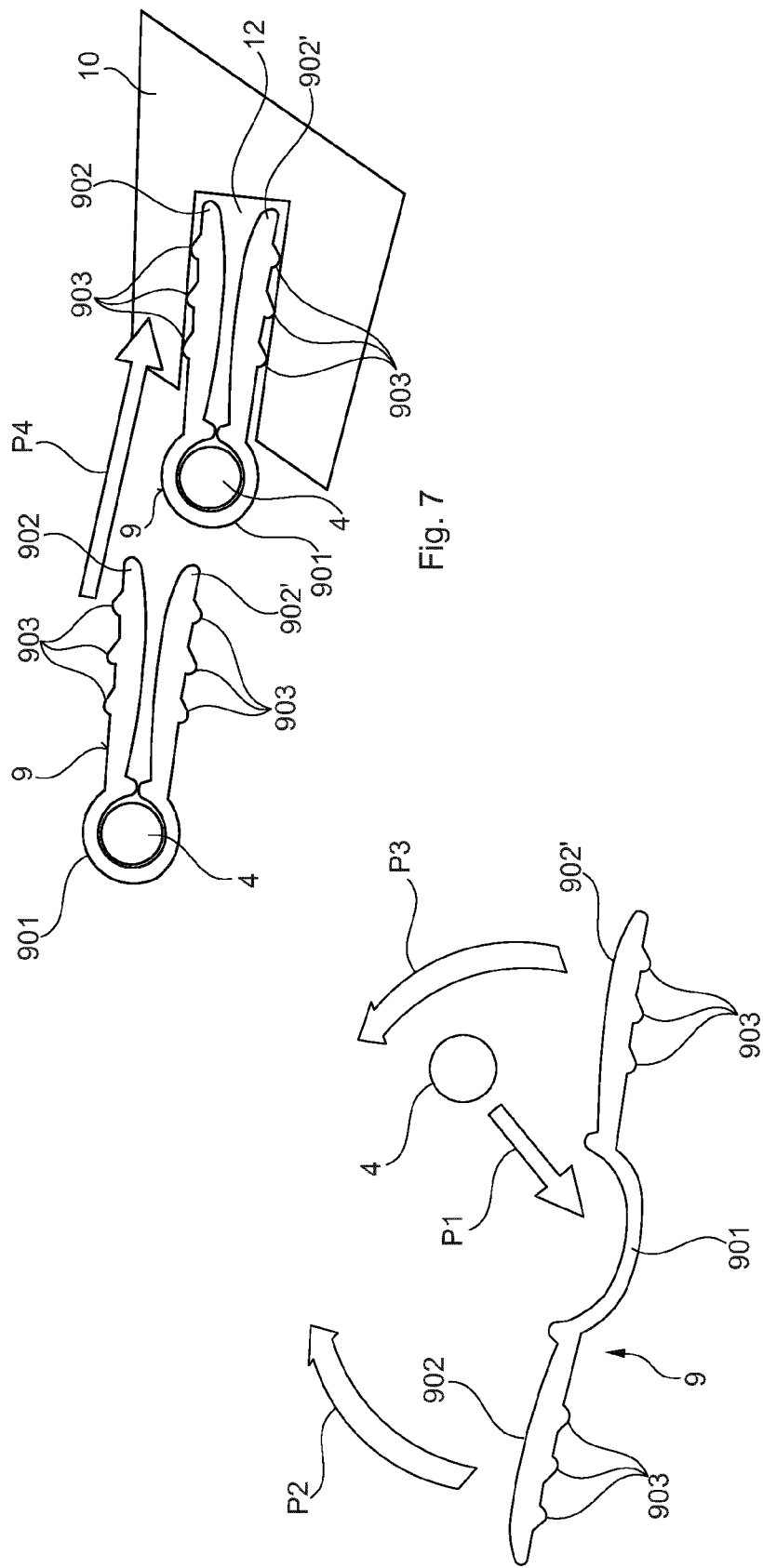

TAIL LIGHT FOR A MOTOR VEHICLE

BACKGROUND AND SUMMARY

The invention relates to a tail light for a motor vehicle.

The prior art discloses various technologies for implementing lighting functions in exterior lights of a motor vehicle. These include the use of flexible light guides which consist of fibers and into which the light of a light source is coupled and illumination of the light guide is thereby produced.

Document DE 10 2016 210 363 B1 discloses an illumination device for a motor vehicle having a laser light source and a light-guiding element in fiber form. The illumination device can be used, for example, as a vehicle tail light.

With flexible light guides in combination with laser light sources, it is possible to achieve an attractive appearance of a vehicle tail light when the rear light is switched on. However, there is the problem that laser light sources have particular requirements during operation. In particular, certain operating temperatures which are significantly lower than in the case of other light sources must not be exceeded. The probability of failure of the rear light function therefore increases.

It is an object of the invention to provide a tail light for a motor vehicle, in which a reliable rear light function is provided despite the use of flexible light guides fed via laser light.

This object is achieved by the tail light according to the claimed invention.

The tail light according to embodiments of the invention serves to distribute light in the exterior space of the motor vehicle at the rear thereof. The motor vehicle can be, for example, a passenger vehicle and optionally also a truck. Where interactions between the tail light and components of the motor vehicle are described below and in particular in the claims, this should always be understood to the effect that the interaction occurs when the tail light is arranged or installed in the motor vehicle. The components of the tail light, which have a corresponding interaction with the motor vehicle or components of the motor vehicle, are therefore configured in such a manner that the interaction is brought about when the tail light is arranged or installed in the motor vehicle.

The tail light according to embodiments of the invention comprises a housing with a light-permeable cover lens. The cover lens preferably has a transmission factor of 50% or more and in particular 90% or more and particularly preferably of 95% or more. Depending on the configuration, the cover lens can be colored (e.g. in red) or uncolored. Nevertheless, it is as always ensured that light from the interior of the housing of the tail light can penetrate to the outside via the cover lens. Here and below, light should be understood as meaning electromagnetic radiation in a wavelength range which is visible to the human eye.

The tail light comprises one or more flexible light guides, which are each at least partially arranged in the housing, wherein a respective light guide contains one or more fibers which extend between two ends of the respective light guide in the longitudinal direction thereof. Furthermore, in the tail light according to embodiments of the invention, one or more laser light sources, preferably in the form of one or more laser diodes, are provided for feeding in light at one end of the respective light guide, wherein the fed-in light causes light emission from the respective light guide along the longitudinal direction thereof. In other words, fed-in light is decoupled from the respective light guide continuously along the length thereof, with the light emerging from the respective light guide preferably along the entire circumference. The respective light guide therefore appears as a luminous element. At least a portion of the light emission from a respective light guide emerges from the tail light via the cover lens as a first light emission. This first light emission belongs to a rear light function.

A rear light or rear light function should be understood as meaning a lighting function, upon the activation of which the tail light permanently emits light (preferably in a red color), wherein the activation of the rear light does not serve to indicate a current or intended driving action of the driver, e.g. braking or indicating. On the contrary, the rear light indicates the position of the motor vehicle. The rear light is distinguished here from other lighting functions, e.g. brake light and indicating light, which are not provided for permanent operation while the motor vehicle is under way. In a plurality of countries, there are legal requirements regarding lighting characteristics of the rear light or the rear light function, e.g. regarding the lighting strength of the rear light from various viewing angles.

The tail light according to embodiments of the invention is distinguished in that a further illumination device having one or more LEDs is provided for the rear light function, in addition to the light guide or the light guides in combination with the laser light sources, the further illumination device being at least partially arranged in the housing and being configured in such a manner that light which originates from the LED or the LEDs emerges from the tail light via the cover lens as a second light emission and belongs to the rear light function. In other words, the rear light function is realized both by the first light emission via the light guide or the light guides and by the second light emission by way of the further illumination device. The rear light function is preferably realized here exclusively via the first light emission and the second light emission. The rear light generally illuminates in a red color, i.e. the first light emission and the second light emission are preferably in a red color.

The tail light according to embodiments of the invention has the advantage that an attractive rear light function is provided using light guides in combination with laser light sources, wherein simultaneously with the rear light function, use is also made of LEDs which are more reliable than laser light sources during operation. In other words, if the laser light sources fail, a rear light function is still provided via the LEDs of the further illumination device. Requirements imposed on the rear light function, that are defined in corresponding standards, are preferably met not only when the laser light source(s) and LED(s) is or are switched on, but also even if only the LED(s) of the further illumination device is switched on and the laser light source(s) of the corresponding light guides is or are not activated. Standards for the rear light are defined, for example, by the Society of Automotive Engineers (SAE), the Economic Commission for Europe (ECE) and the China Compulsory Certificate (CCC).

In a preferred embodiment of the tail light according to the invention, the laser light source or the laser light sources and/or the LED or the LEDs is or are configured in such a manner that they emit red light during operation. Red light should be understood here and below as meaning light having a wavelength in the range between 620 nm and 780 nm. The laser light sources or the LEDs can optionally also emit light in a different color or white light. The effect which can be achieved by a colored cover lens is that the rear light appears in a red color for the observer.

In a further preferred refinement, each laser light source in the tail light according to the invention is assigned a temperature-measuring device which detects the temperature at the respective laser light source, the respective laser light source being dimmed or switched off if the temperature exceeds a predetermined threshold. This threshold is preferably between 60° C. and 90° C. It is thereby ensured that the temperature-sensitive laser light sources do not become damaged during operation. Nevertheless, when the laser light sources are switched off, the rear light function continues to be ensured via the second light emission of the further illumination device. Furthermore, with the protection of the laser light sources via a corresponding temperature measurement, complicated cooling of the laser light sources can be dispensed with since damage to the laser light sources is already prevented by the prompt dimming or switching off thereof. The temperature-measuring device for each laser light source can optionally use a dedicated temperature sensor, wherein the corresponding laser light source is then dimmed or switched off if the assigned temperature sensor measures a temperature above the predetermined threshold. Nevertheless, a common temperature-measuring device for all of the laser light sources can also be provided. In this case, all of the laser light sources are dimmed or switched off if the temperature-measuring device measures a temperature which exceeds the predetermined threshold.

The further illumination device installed in the tail light according to embodiments of the invention can be based on any desired technology. For example, the further illumination device can comprise one or more reflectors for reflecting light of the LED or the LEDs, and/or one or more optical lenses for refracting light of the LED or the LEDs.

In a particularly preferred embodiment, the further illumination device contains a rigid surface light guide, which is generally also referred to as a thick-wall optical system. This surface light guide produces, from light of the LED or the LEDs, an illumination surface representing at least a portion of the second light emission, and preferably all of the second light emission.

The further illumination device can optionally also comprise one or more flexible light guides which now, however, are fed by LEDs and not by laser light sources. In other words, in one embodiment of the invention, the further illumination device comprises one or more (additional) flexible light guides which, in addition to the light guide or light guides which is or are already present and fed via laser light sources, are integrated in the tail light. These flexible light guides are also each at least partially arranged in the housing, wherein a respective light guide contains one or more fibers which extend between two ends of the respective light guide in the longitudinal direction thereof, wherein at least a portion of the LED or LEDs is provided for feeding in light at one end of the respective light guide, and the fed-in light causes light emission from the respective light guide along the longitudinal direction thereof, wherein at least a portion of the light emission emerges from the tail light via the cover lens as at least a portion of the second light emission.

In a particularly preferred variant, the respective light guides which are fed via laser light sources, or optionally also the light guides which are fed via LEDs (if present), are fastened by way of a profile in the housing in a simple manner. A predetermined section of the respective light guide is held by a profile in a support in the interior of the housing, wherein the profile has a light-permeable receiving section, in which the predetermined section is received and fixed, and a fastening section, which extends from the receiving section into a depression of the support and is fixed there and which is preferably likewise light-permeable. Optionally, a plurality of predetermined sections with corresponding fastening in the support via a profile can also be provided. There is therefore a corresponding profile for each predetermined section of the light guide or the light guides. The light guides can be fastened in separate supports via the profile. Optionally, a common support for all of the light guides can also be provided.

One or more further light guides can optionally also be installed in the rear light, the light guides being fastened in the housing in a different way (i.e. not via a profile). However, in a preferred variant, all of the light guides installed in the lighting device are held via a corresponding profile according to the features of the embodiment just described.

The variant just described of the tail light according to the invention has the advantage that a flexible light guide can be fastened in the interior of the tail light in a simple manner via a profile, with it being ensured at the same time that the profile does not conceal the light emission of the light guide because of the light permeability of the receiving section. Depending on the configuration, the light-permeable receiving section and optionally also the fastening section can have a different transmission factor. The transmission factor is preferably 50% or more and in particular 90% or more. The light-permeable receiving section is preferably not colored here, and this is optionally also true of the fastening section.

In a particularly preferred embodiment, the predetermined section, via which the respective light guide is held in the interior of the housing, contains a region of the respective light guide that is visible via the cover lens when light is fed into the respective light guide (i.e. when the laser light source(s) or LED(s) is or are switched on) and optionally also without light being fed in. In other words, a region of the light guide that appears as a luminous section of the light guide to an observer from the outside when light is correspondingly fed in is received in the profile. With this embodiment, an attractive design can be achieved to the effect that the light guide is perceived to be a free-floating luminous element behind the cover lens of the tail light.

The light guide or the light guides (i.e. the light guide or the light guides fed via the laser light source(s) and optionally also the light guide or the light guides of the further illumination device) can be configured differently. Preferably, a respective light guide has a round cross section which has in particular a diameter of between 0.05 mm and 5 mm and particularly preferably of between 0.1 mm and 3 mm. The fiber or the fibers in a respective light guide is or are preferably glass fibers. A respective light guide is preferably formed from a plurality of fibers. In particular, a respective light guide comprises 10 to 200 fibers.

In a particularly preferred embodiment, the respective light guide is clamped in the receiving section of the profile. Alternatively or additionally, the light guide can also be latched and/or adhesively bonded in the receiving section. This ensures good fixing of the light guide in the receiving section.

In a particularly preferred embodiment, the profile is an integral component, as a result of which the manufacturing thereof is simplified. Preferably, the entire profile is formed from the same material. In a further preferred variant, the profile is formed from plastic. The profile is preferably an extrusion component. In a particularly preferred embodiment, the plastic comprises polymethyl methacrylate (PMMA).

In a further particularly preferred embodiment of the tail light according to the invention, the receiving section of the profile and preferably the entire profile is formed from flexurally elastic material. This material is preferably bendable in such a manner that it permits a minimum bending radius of the predetermined section of 100 mm or less, in particular of 10 mm or less and particularly preferably of 6 mm or less. With such a flexurally elastic profile, simple and flexible fastening of the light guide in the corresponding support is ensured. In particular, it is also made possible for the predetermined section to be guided at least partially in a curved manner in the profile, as a result of which an attractive shaping of the light guides installed in the tail light can be achieved. In the case of the curved guiding of the predetermined section, the corresponding depression is also configured to be curved in its profile along the support.

In a further preferred variant, the receiving section of the profile is a section of the flexurally elastic material which is bent around at least part of the circumference of the respective light guide. In this way, simple fixing of the light guide in the receiving section can be achieved by a force fit or form fit.

In a further preferred variant, the fastening section of the profile is clamped in the depression of the support. Alternatively or additionally, the fastening section can also be latched and/or adhesively bonded in the depression.

In a further preferred refinement, the profile comprises, as the fastening section, two flanges which lie against each other, extend at least in certain sections into the depression of the support and are preferably formed continuously along the longitudinal direction of the respective light guide in the predetermined section, wherein the receiving section connects the flanges to each other. This variant permits a simple installation of the profile in the corresponding support.

In a further variant, the fastening section of the profile comprises one or more protrusions which make contact with an inner wall of the depression of the support. These protrusions preferably bring about latching of the fastening section in the depression. Alternatively or additionally, in the region of the protrusions, the fastening section can also be clamped and/or adhesively bonded in the depression. The protrusions can be configured, for example, as ribs and/or teeth. Should the fastening section contain the above-described flanges, the corresponding protrusions are formed on the outer sides, which face away from one another, of the flanges or optionally also only on one of these outer sides.

In a further preferred refinement, the support is arranged on an opaque cover and light is fed into the end of the light guide or the light guides behind the cover. In other words, the laser light source(s) or the LED(s) are located behind the cover. This ensures that the laser light sources or the LEDs are not visible via the cover lens.

In addition to the above-described tail light, the invention relates to a motor vehicle which comprises one or more tail lights according to embodiments of the invention.

An exemplary embodiment of the invention will be described in detail below with reference to the attached figures.

BRIEF DESCRIPTION OF THE DRAWINGS

FIG. 6 and FIG. 7 show sectional views which illustrate the installation of the light guide in the tail light using the profile.

DETAILED DESCRIPTION OF THE DRAWINGS

An embodiment of the invention is described below with reference to the left tail light of a motor vehicle. The tail light includes a plurality of flexible light guides which form part of the rear light of the tail light and are fed by respective laser light sources in the form of laser diodes. It is essential to the embodiment of invention here that, in addition to the flexible light guides, a further illumination device is additionally also provided which likewise produces a portion of the rear light. This further illumination device will be described in more detail further below with reference to FIG. 2 and is denoted there by reference sign 16. The rear light is therefore composed of light emissions of the flexible light guides and of the further illumination device. In contrast to the light guides, the further illumination device is fed by LEDs which are more reliable than laser diodes in operation and in particular permit higher temperatures than laser diodes. Should failure of the laser diodes or switching off thereof occur because of excessive temperatures, the rear light continues to be provided via the further illumination device. The light emission generated by the further illumination device is preferably configured here in such a manner that requirements imposed on the rear light, which are defined in corresponding standards, are met even if the laser diodes are switched off and only the further illumination device is in operation.

Figure 1:
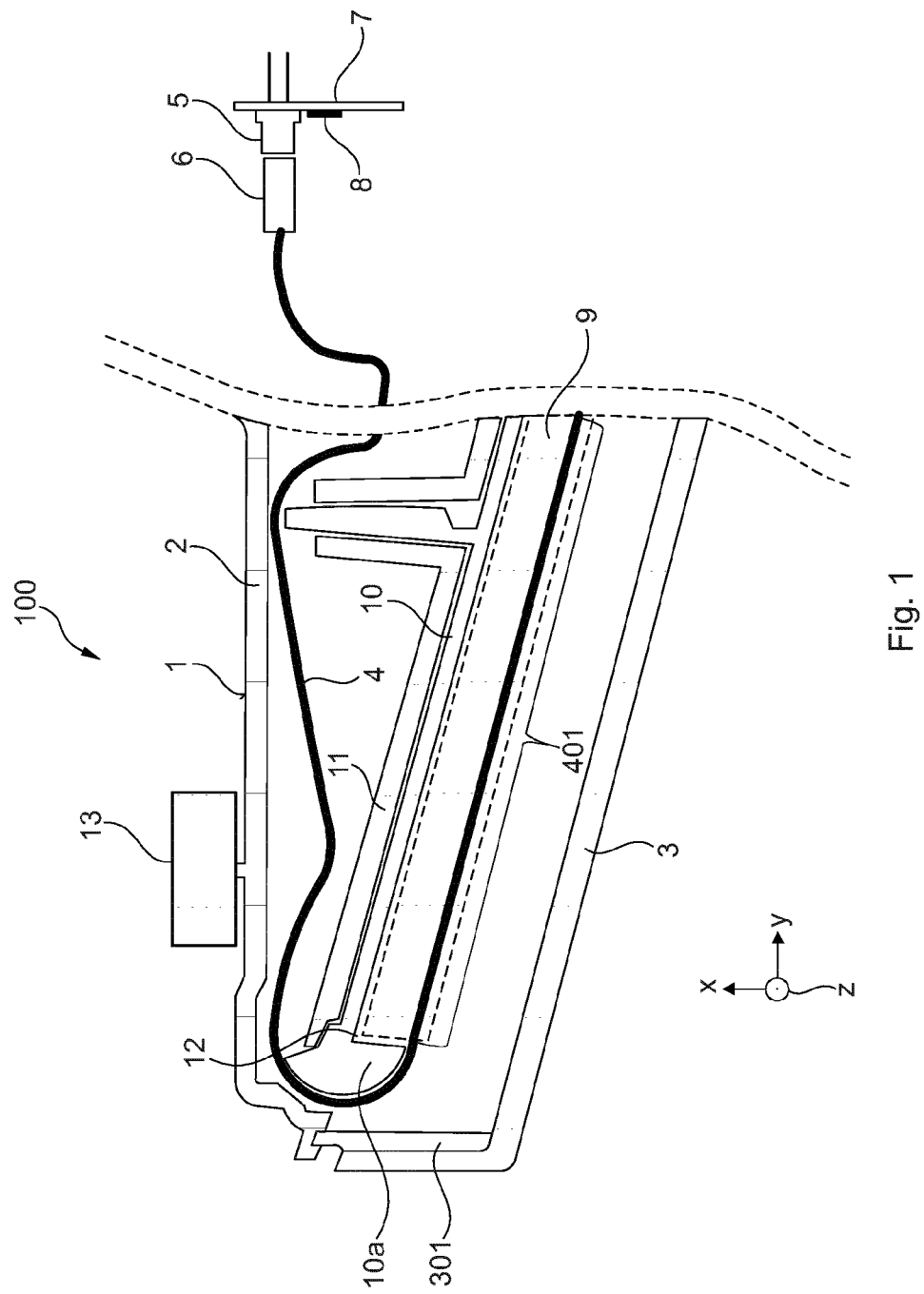
FIG. 1 shows a sectional view along a horizontal plane through an embodiment of a tail light according to the invention.

FIG. 1 shows, in a schematic illustration, a section through the tail light along a horizontal plane which runs through a light guide installed in the tail light. In FIG. 1, the spatial orientation of the tail light is indicated by a Cartesian system of coordinates. Here, the x axis corresponds to the longitudinal direction of the motor vehicle or the direction of travel thereof forward, the y axis is the transverse direction of the motor vehicle from left to right, and the z axis is the vertical direction of the motor vehicle from bottom upward.

FIG. 1 reproduces a left partial region of the tail light, the tail light being denoted by reference sign 100. The tail light has a closed housing 1 which comprises a rear housing section 2 and a light-permeable cover lens 3. On the cover lens 3 is provided a connecting section 301 via which the cover lens is connected to the rear housing section 2. The rear housing section lies against the motor vehicle via a peripheral seal 13. In the interior of the housing 1, a plurality of flexible light guides 4, inter alia, are provided, wherein one of these light guides is illustrated in section and denoted by reference sign 4 in FIG. 1. The light guide comprises a bundle of a plurality of light-guiding fibers which, in the embodiment described here, are glass fibers which are encased by a plastic. The flexible light guide can optionally also consist of fibers of a different material.

The flexible light guide 4 comprises, at one end, a fiber coupler 6 via which light is fed into the light guide by way of a red laser diode 5. The laser diode 5 is fastened here on a circuit board 7 on which a temperature sensor 8 is also provided. In order to protect the laser diode 5 from overheating, the temperature during the operation thereof is detected by the temperature sensor 8. If the temperature exceeds a certain threshold value, the laser diode is dimmed or switched off. A corresponding laser diode 5 is provided for feeding in light to each of the light guides installed in the tail light. Similarly, for each light guide a fiber coupler 6 is provided via which the light of the associated laser light source enters the light guide. All of the laser diodes are preferably installed on a common circuit board and use the same temperature sensor for protection against overheating.

It is ensured by the overheating protection just described for the laser diodes by way of a temperature sensor that damage to the laser diodes does not occur when the rear light function is activated. Complicated cooling of the laser diodes can therefore be dispensed with since the prompt dimming or switching off thereof is ensured by the monitoring of the temperature. However, when the laser diodes are switched off, the further illumination device 16, which is described further below, remains in operation, and therefore the rear light function continues to be provided.

All of the laser diodes 5 installed in the tail light and the corresponding fiber couplers 6 and the circuit board 7 with the temperature sensor 8 are arranged in the interior of the housing 2 behind a cover 11. The feeding in of light by the laser diodes is therefore not visible via the cover lens 3. The red light of the laser diode 5, which light is coupled into the light guide 4 via the fiber coupler 6, is guided along the light guide in the longitudinal direction thereof and emerges continuously from the light guide along the entire circumference thereof. Red illumination of the light guide is thus brought about.

The light guide 4 is guided around the cover 11 at the left end of the housing 1, with use being made for this purpose of a support 10 which is mechanically connected to the cover. The support 10 comprises a semicircular section 10a which, along its circumference, contains a groove in which a subsection of the light guide 4 is accommodated which is guided from the rear side of the cover 11 to the front region of the housing 1 adjacent to the cover lens 3. The light guide 4 extends from there to the right.

On the front side of the support 10 there is a depression or recess 12 in which a fastening section of a light-permeable profile 9 is accommodated. The profile is indicated merely schematically in FIG. 1 by a dashed outline and will be explained in more detail further below with reference to other figures. The light guide can be fastened in a simple manner in the interior of the housing via the profile 9, with the emerging of light in the region of the profile being ensured because of the light permeability thereof. The light of the light guide 5 accommodated in the profile can therefore emerge from the tail light via the profile and the light-permeable cover lens 3. The light-permeable cover lens can be without color here and can let a large portion of the emerging light through it. In other words, in a preferred variant, the cover lens is transparent. Nevertheless, the cover lens can optionally also be colored, e.g. in a red color corresponding to the color of the light emitted via the light guide 4.

Figure 2:
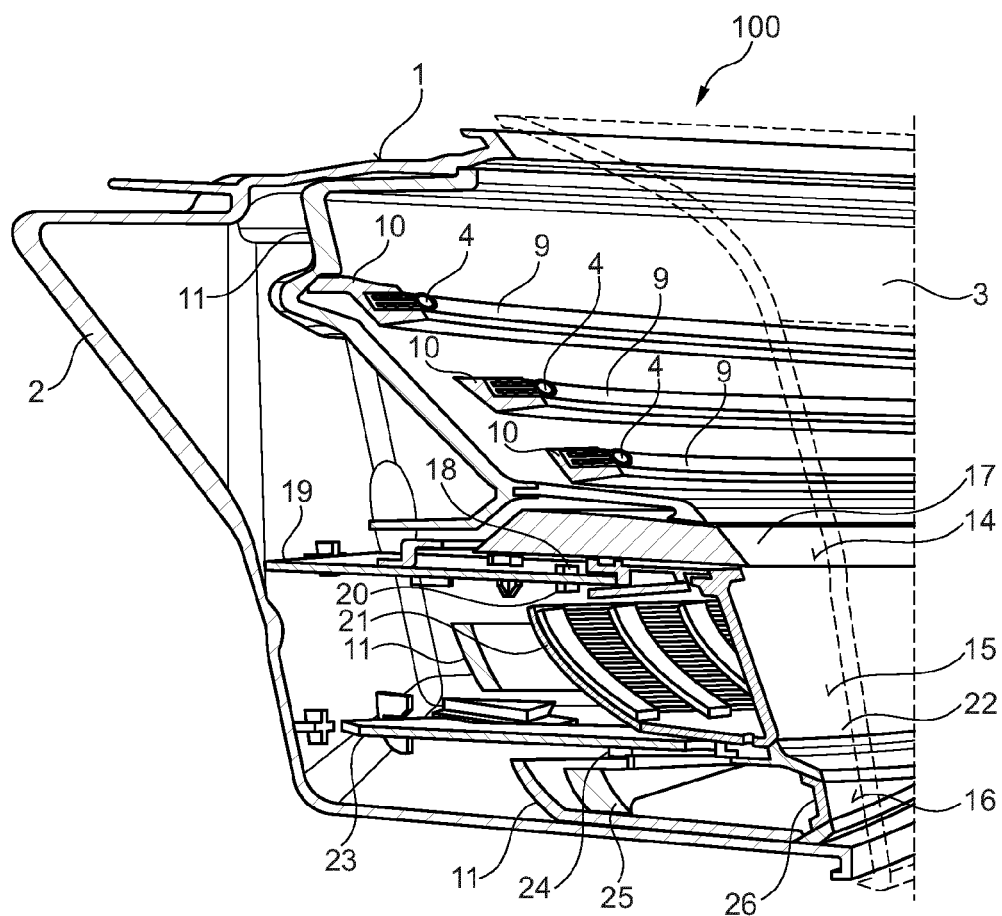
FIG. 2 shows a perspective sectioned view of the tail light from FIG. 1.

FIG. 2 shows, in a perspective illustration, a section through the tail light of FIG. 1, wherein relevant components are denoted with reference signs and described below only for understanding embodiments of the invention. The section lies in a plane which is spanned by the x direction and z direction of the system of coordinates reproduced in FIG. 1. It is seen from FIG. 2 that three light guides 4 arranged one above another are provided in the interior of the tail light 100 and furthermore further illumination devices are also installed. In particular, it is apparent that the corresponding light guides 4 are accommodated within respective profiles 9, and a fastening section of the respective profiles is positioned in a depression of a corresponding support 10, which will also be described in more detail further below. For clarity reasons, reference signs for the depressions and for sections of the profile have been omitted in FIG. 2. However, corresponding reference signs are contained in other figures.

The cover 11 which is located not only in the region of the light guides 4 but also has sections and openings which lie therebelow and through which components of the tail light extend is apparent from FIG. 2. According to FIG. 2, the tail light contains the three further illumination devices 14, 15 and 16 in addition to the three light guides 4. The illumination device 14 here is the direction of travel indicator of the tail light. This illumination device comprises a plurality of LEDs 18 which are arranged on the upper side of a circuit board 19, wherein only one of these LEDs is apparent in FIG. 1. The LEDs radiate yellow light in a surface light guide 17 in the form of a thick-wall optical system which is known per se. During operation of the indicator, this light emerges from the front side of the thick-wall optical system and subsequently from the housing 1 of the tail light. The direction of travel selected by the driver is thus indicated by corresponding flashing of the LEDs 18.

Located below the illumination device 14 is the illumination device 15 which constitutes the brake light of the tail light, i.e. the illumination device 15 is activated whenever the driver steps on the brake. The illumination device 15 comprises a curved reflector 21 and a plurality of LEDs 20, with again only one of these LEDs being apparent in FIG. 2. The LEDs are arranged on the underside of the circuit board 19 and radiate red light downward onto the reflector 21 which directs the light via an intermediate light lens 22 to the cover lens 3 and therefore into the exterior space of the motor vehicle.

Located below the illumination device 15 is a further illumination device 16 which forms an essential part of the tail light 100 and, in addition to the light guides 4, forms the rear light of the tail light 100. The illumination device 16 comprises a plurality of LEDs 24, with again only one of these LEDs being apparent from FIG. 2. The LEDs 24 are arranged on the underside of the circuit board 23 and radiate red light downward to a reflector 25 which directs the light via an intermediate light lens 26 to the cover lens 16 and therefore into the exterior region of the motor vehicle. Should dimming or switching off of the above-described laser diodes 5 occur due to overheating or should the laser diodes fail for a different reason, the LEDs 24 continue to operate and provide the rear light function.

Figure 3:
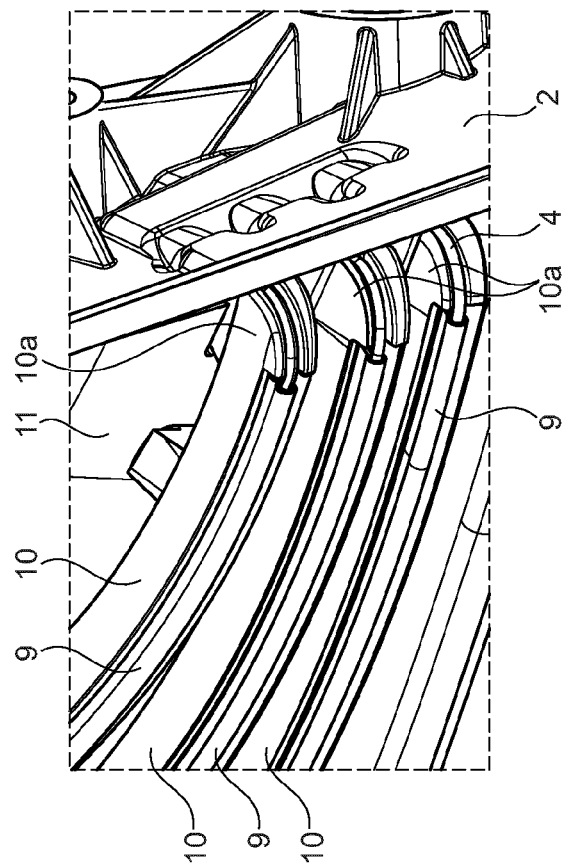
FIG. 3 shows a perspective detailed view of the tail light from FIG. 1 and FIG. 2.

FIG. 3 shows, in a perspective illustration, a detail of the tail light from FIG. 1 and FIG. 2 in a right region at a point at which the light guides 4 are guided again behind the cover 11 from the front side of the associated supports 10. It is seen in FIG. 3 in particular that the supports 10 provided for the respective light guide also have, at their right end, a semicircular section 10a in which the corresponding light guide is guided around the support 10 to the rear side of the cover 11. The respective light guides 4 finally end behind the cover 11, i.e. the end of the respective light guides that is opposite the end with the fiber coupler 6 is located behind the cover. In a preferred embodiment, a detection unit is provided there in order to detect the light intensity of the emerging light. Should the light intensity fall below a certain threshold value, it should be assumed that the light of the corresponding laser diode is propagating undesirably, whereupon the laser diode is switched off by way of a controller in order to avoid damaging the eyes of an observer via laser light emerging in an uncontrolled manner.

Figure 4:
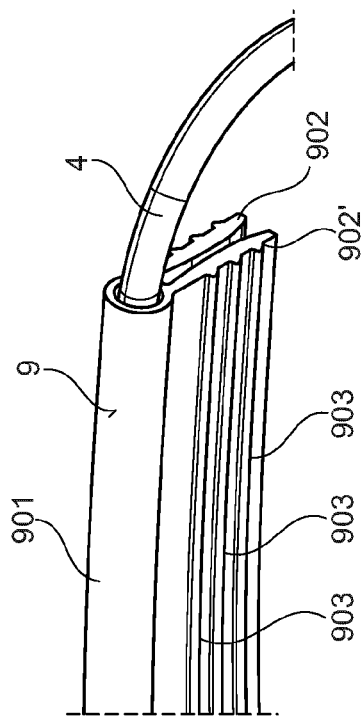
FIG. 4 shows a perspective detailed view which illustrates the guiding of the light guide in a profile.

FIG. 4 shows, in a perspective detailed illustration, a section of the profile 9 with a light guide 4 accommodated therein. As is seen, the profile comprises a round receiving section 901 in which the light guide is fixed. This fixing is preferably achieved by clamping of the light guide in the receiving section 901, wherein the light guide can alternatively or additionally also be adhesively bonded in the receiving section. Two flanges 902 and 902' adjoin the receiving section 901, the flanges lying against each other and, on the outer side, in each case having three protrusions 903 in the form of elongate ribs which run parallel to one another in the longitudinal direction of the profile.

Figure 5:
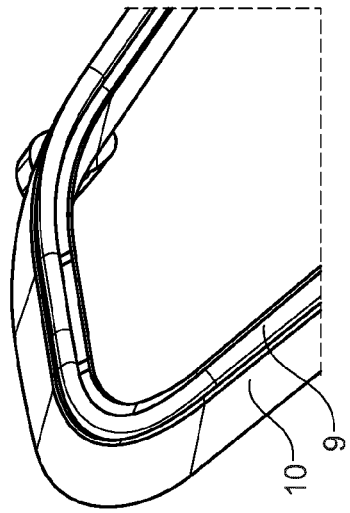
FIG. 5 shows a perspective detailed view which illustrates a curved section of the light guide in the tail light from FIG. 1 and FIG. 2.

The profile 9 is an integral component composed of a flexurally elastic and light-permeable plastic, with the light transmission factor of the plastic preferably being 90% or more. The profile 9 is preferably elastic such that bending of the light guide 4 accommodated in the receiving section 901 with a bending radius of 6 mm and optionally also less can be achieved. Accordingly, the light guide 4 can also be guided in a curved manner within the profile 9, wherein, for this purpose, the support 10 with the depression 12 provided therein is also configured in a correspondingly curved manner. A section of a curved guide of the light guide 4 along the profile 9 and the support 10 is shown by way of example in the perspective illustration of FIG. 5. As is seen there, the support 10 is curved in the detail illustrated and, in its depression, contains the correspondingly shaped profile 9 which, in turn, accommodates the light guide (not apparent in FIG. 5).

FIG. 6 and FIG. 7 illustrate how the light guide 4 is fastened in the support 10 via the profile 9. In FIG. 6 and FIG. 7, the light guide 4 and the profile 9 are reproduced in cross section. According to FIG. 6, the profile, which is preferably produced by an extrusion process, is initially present after its manufacturing as a flat component which comprises a hollow which forms the receiving section 901 after installation of the profile in the tail light. The respective flanges 902 and 902' which contain the grooves 903 on the underside extend to the left and right of the hollow according to FIG. 6.

In order to install the light guide 4 in the tail light 100, the light guide is first of all placed into the hollow of the profile 9, as is indicated by the arrow P1 in FIG. 6. Subsequently, the two flanges 902 and 902' are folded upward, as indicated by the arrows P2 and P3. This is easily possible because of the flexural elasticity of the material of the profile 9. The profile 9 folded together in such a manner with the light guide 4 accommodated therein is subsequently inserted into the depression 12 of the support 10, as is apparent in FIG. 7 and indicated there by the arrow P4. After the profile has been inserted, the two flanges 902 and 902' press onto opposite sides of the inner wall of the depression 12 such that the grooves 903 lie against the inner wall. The grooves have a shape which brings about clamping and/or latching of the flanges on the inner wall of the depression, and therefore good holding of the profile 9 and therefore of the light guide 4 on the support 10 is achieved. The outer sides of the flanges 902 and 902' can optionally be provided with adhesive before the profile 9 is pushed into the depression 12 of the support 10, and therefore holding of the profile in the depression is also achieved by an adhesive bond.

The previously described embodiment of the invention has a series of advantages. By way of the combination of one or more light guides fed via laser diodes with an illumination device operated via LEDs, the reliability of operation of the rear light can be improved. In particular, the rear light function can be provided by the operation of the highly robust and temperature-stable LEDs even if failure of the laser diodes and therefore of the light generated via the light guides occurs. Nevertheless, at the same time an attractive rear light is ensured by the use of the light guides fed via laser diodes. Furthermore, all of the photometric values of the rear light function (light strength, viewing angle, etc.) defined in corresponding standards can be observed by it being ensured that these values are satisfied not only when the light guides and also the further illumination device are in operation, but also whenever only the further illumination device is in operation.

| List of designations | |
| --- | --- |
| 100 | tail light |
| 1 | housing |
| 2 | rear housing section |
| 3 | cover lens |
| 301 | connecting section |
| 4 | light guide |
| 401 | predetermined section of the light guide |
| 5 | laser diode |
| 6 | fiber coupler |
| 7 | circuit board |
| 8 | temperature sensor |
| 9 | profile |
| 901 | receiving section |
| 902, 90' | flanges (fastening section) |
| 903 | ribs |
| 10 | support |
| 10a | semicircular section of the support |
| 11 | cover |
| 12 | depression |
| 13 | seal |
| 14 | direction of travel indicator |
| 15 | brake light |
| 16 | further illumination device for a portion of the |
| 17 | thick-wall optical system |
| 18 | LED |
| 19 | circuit board |
| 20 | LED |
| 21 | reflector |
| 22 | intermediate light lens |
| 23 | circuit board |
| 24 | LED |
| 25 | reflector |
| 26 | intermediate light lens |

P1, P2, P3, P4 arrows

The invention claimed is:
1. A tail light for a motor vehicle, the tail light comprising:
a housing with a light-permeable cover lens;
at least one flexible light guide at least partially arranged in the housing, wherein a respective light guide contains at least one fiber which extends between two ends of the respective light guide in a longitudinal direction of the respective light guide, wherein at least one laser light source is provided for feeding in light at one end of the respective light guide and the fed-in light causes light emission from the respective light guide along the longitudinal direction of the respective light guide, and wherein at least a portion of the light emission emerges from the tail light via the cover lens as a first light emission and belongs to a rear light function; and
a further illumination device for the rear light function, wherein:
the further illumination device comprises at least one LED, the further illumination device is at least partially arranged in the housing, and the further illumination device is configured such that light which originates from the at least one LED emerges from the tail light via the cover lens as a second light emission and belongs to the rear light function.

2. The tail light according to claim 1, wherein the at least one laser light source and/or the at least one LED is configured to emit red light during operation.

3. The tail light according to claim 1, wherein:
each laser light source is assigned a temperature-measuring device which detects a temperature at the respective laser light source, and
the respective laser light source is dimmed or switched off upon the temperature exceeding a predetermined threshold.

4. The tail light according to claim 1, wherein the further illumination device further comprises at least one reflector for reflecting light of the at least one LED, and/or one at least one optical lens for refracting light of the at least one LED.

5. The tail light according to claim 1, wherein the further illumination device further comprises a rigid surface light guide in order, from light of the at least one LED, to produce an illumination surface representing at least a portion of the second light emission.

6. The tail light according to claim 1, wherein:
the further illumination device further comprises at least one additional flexible light source at least partially arranged in the housing,
a respective additional light guide contains at least one fiber which extends between two ends of the respective additional light guide in a longitudinal direction of the respective additional light guide,
at least a portion of the at least one LED is provided for feeding in light at one end of the respective additional light guide, and the fed-in light causes light emission from the respective additional light guide along the longitudinal direction of the respective additional light guide, and
at least a portion of the light emission from the respective additional light side emerges from the tail light via the cover lens as at least a portion of the second light emission.

7. The tail light according to claim 1, wherein:
a predetermined section of the respective light guide is held by a profile in a support in the interior of the housing, and the profile has a light-permeable receiving section in which the predetermined section is received and fixed, and a fastening section which extends from the receiving section into a depression of the support and is fixed in the depression of the support.

8. The tail light according to claim 7, wherein the predetermined section contains a region of the respective light guide that is visible via the cover lens when light is fed into the respective light guide.

9. The tail light according to claim 7, wherein the receiving section of the profile is formed from flexurally elastic material which permits a minimum bending radius of the predetermined section of 100 mm or less.

10. The tail light according to claim 9, wherein the predetermined section is guided at least partially in a curved manner in the profile.

11. The tail light according to claim 9, wherein the receiving section of the profile is a section of the flexurally elastic material which is bent around at least part of a circumference of the respective light guide.

12. The tail light according to claim 7, wherein the entire profile is formed from flexurally elastic material which permits a minimum bending radius of the predetermined section of 100 mm or less.

13. The tail light according to claim 7, wherein the minimum bending radius is 10 mm or less.

14. The tail light according to claim 7, wherein the minimum bending radius is 6 mm or less.

15. The tail light according to claim 7, wherein:
the profile comprises, as the fastening section, two flanges which lie against each other, extend at least in certain sections into the depression of the support and are formed continuously along the longitudinal direction of the respective light guide in the predetermined section, and
the receiving section connects the flanges to each other.

16. The tail light according to claim 7, wherein the fastening section of the profile comprises at least one protrusion which makes contact with an inner wall of the depression of the support.

17. The tail light according to claim 7, wherein the support is arranged on an opaque cover and light is fed into the end of the at least one light guide behind the cover.

18. A motor vehicle comprising the tail light according to claim 1.

* * * * *